April 14, 1936.  R. E. NEWELL  2,037,142
THERMOSTATIC STRUCTURE
Filed Oct. 25, 1934  3 Sheets-Sheet 1
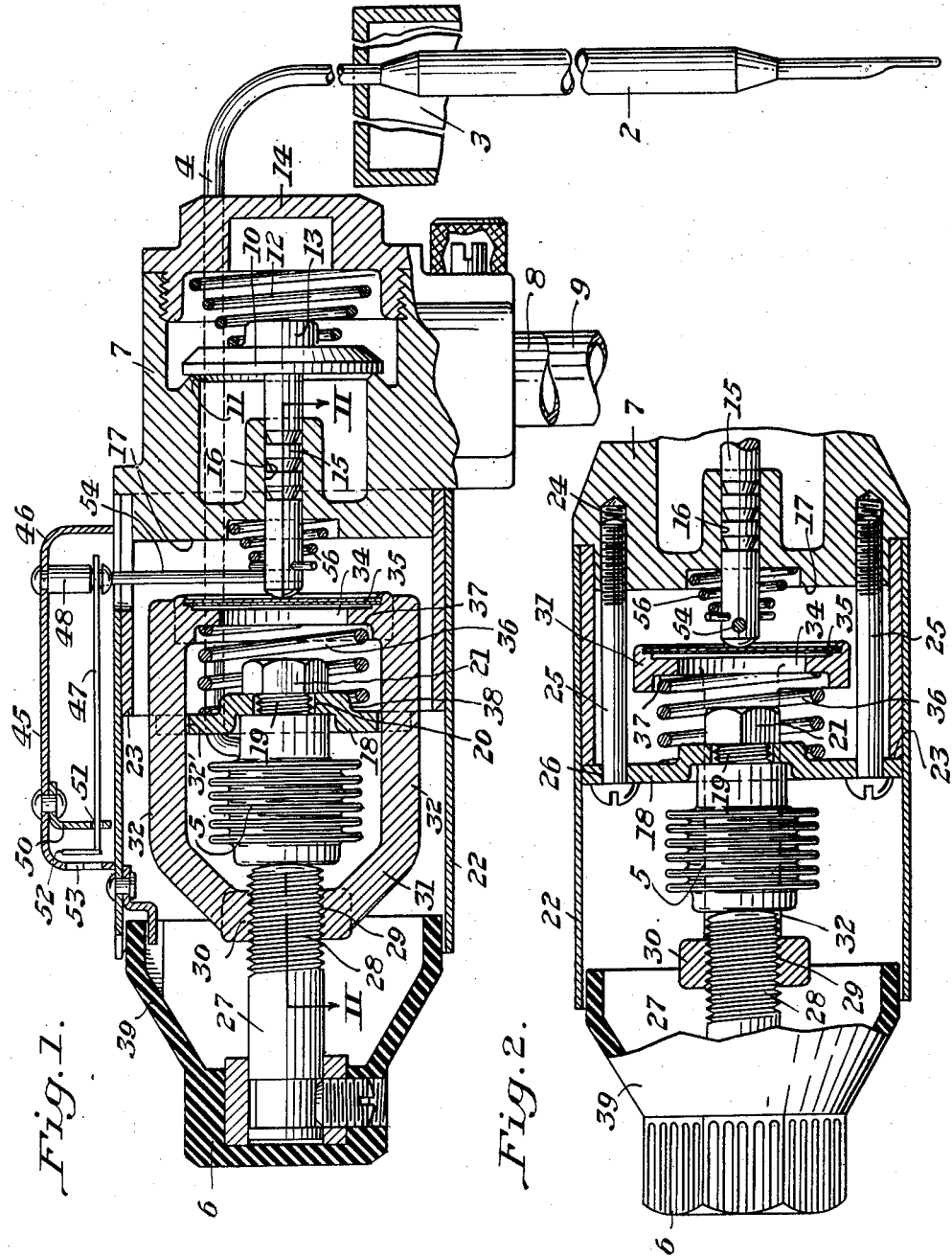
INVENTOR
Robert E. Newell
By Byrnes, Stebbins
& Blenko
Attorneys April 14, 1936.    R. E. NEWELL    2,037,142
THERMOSTATIC STRUCTURE
Filed Oct. 25, 1934    3 Sheets-Sheet 3
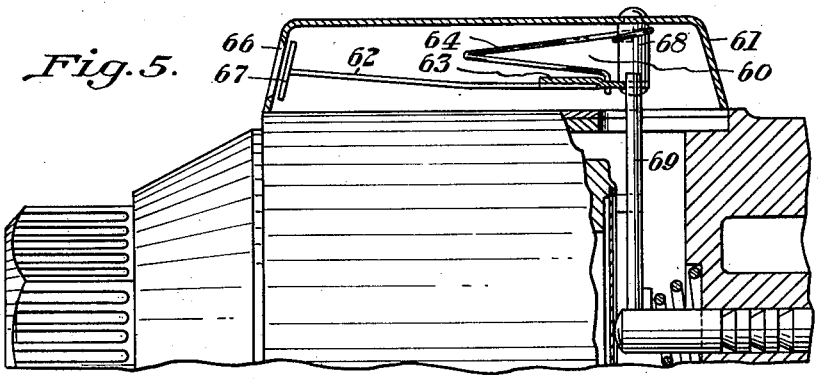
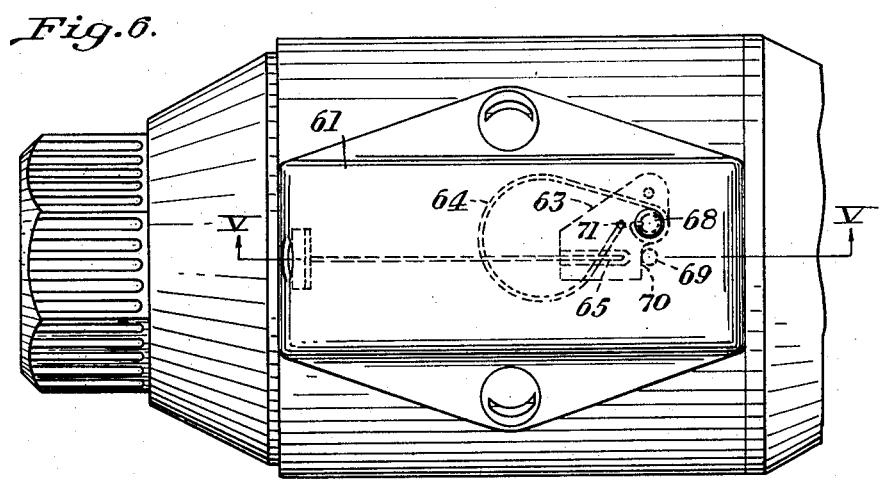
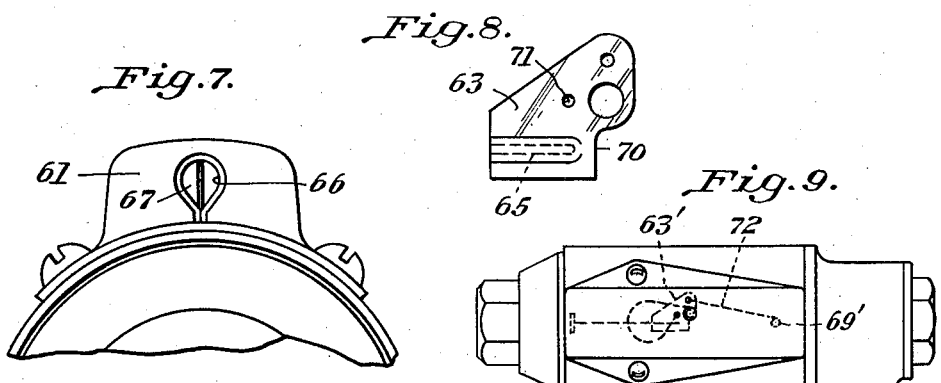
INVENTOR
Robert E. Newell
By Byrnes Stebbins
and Blenko
Attorneys Patented Apr. 14, 1936

2,037,142

UNITED STATES PATENT OFFICE 2,037,142

THERMOSTATIC STRUCTURE

Robert E. Newell, Irwin, Pa., assignor to Robertshaw Thermostat Company, Youngwood, Pa., a corporation of Pennsylvania Application October 25, 1934, Serial No. 749,953

8 Claims. (Cl. 236—94)

The present invention relates generally to thermostatic structures, and more particularly to indicating means for use in conjunction with various types of thermostats for effecting control of a controlling element such as a valve, a switch or the like.

In various types of constructions embodying thermostatic control, it is desirable to provide a thermometer or some sort of indicator for showing the temperature of the chamber, the temperature of which is to be controlled by the thermostat. For instance, in ranges embodying an oven, the temperature of which is to be controlled by a thermostatic structure, it is desirable to provide a thermometer or indicator to show the temperature of the oven. It is not necessary that the temperature indicating means show the exact temperature of the oven at any particular time but only that it show whether or not the oven has reached the temperature for which it has been set, or whether the temperature is above or below that desired.

The object of the present invention is to provide a thermostatic structure embodying an indicator which will show the temperature of the chamber being controlled by the thermostat. In accordance with my invention I provide a structure of this character which shows when the temperature for which the chamber has been set is reached and whether or not the temperature of the chamber is below or above that desired. It is a further object of the present invention to provide a structure which will accomplish this purpose and at the same time be compact, universally applicable to electric or gas operated thermostats, and which has a low manufacturing cost.

Another important feature of the present invention is that it provides a structure which makes it possible to determine at a glance whether or not the thermostat adjusting dial is properly calibrated and to readjust this dial if it is not properly calibrated without lighting the oven burner or blowing through the valve as has heretofore been necessary. In other words, the present invention provides a structure which makes it possible to "cold check" the thermostatic structure.

In the accompanying drawings the structure which I provide is not illustrated in connection with any particular device, but the thermostatic structure shown therein is of such a character that it may readily be mounted on a gas range. In such a construction the thermostat will control the operation of the valve for supplying fuel to the oven burner, the bulb of the particular type of thermostatic structure shown in the drawings being located in the oven. In the copending application of Robert E. Newell, Clarence W. Robertshaw and William B. Mackintosh, Serial No. 718,758, filed April 3, 1934, there is shown and specifically described therein a thermostatic structure such as that disclosed in this application, except that the structure shown therein does not embody the indicating means provided by my present invention. In that application a structure of the character shown in the drawings of this application is shown as being mounted on a gas range, and reference is hereby made to said application for a disclosure of an appropriate mounting of such a thermostatic structure in a device embodying a chamber, the temperature of which is to be controlled. Reference is also hereby made to said application for a more detailed description of the operation of a structure such as that shown in the drawings of this application than will be given herein.

In the drawings I have shown for purposes of illustration only several embodiments of my invention. It will be understood that my invention is not limited to the particular constructions shown in the drawings and that my invention may be otherwise embodied. It will also be understood that my invention is not limited to bellows type thermostatic structures nor to structures wherein the thermally responsive element is adapted to operate a valve, for my invention is equally applicable to other types of thermostatic structures and to structures wherein the controller is other than a valve, for instance, a switch.

In the drawings,—

Figure 1 is a vertical sectional view through a structure embodying my invention, the chamber, the temperature of which is to be controlled, being shown diagrammatically;

Figure 2 is a sectional view taken along the line II—II of Figure 1;

Figure 5 is a broken view, partly in elevation and partly in section, showing a different embodiment of my invention than that shown in Figures 1 to 4, inclusive;

Figure 6 is a partial plan view of the structure shown in Figure 5;

Figure 7 is a partial front elevational view of the structure shown in Figures 5 and 6;

Figure 8 is a detail view of the operating lever; and

Figure 9 is a top plan view of a further form of this invention.

Figure 3:
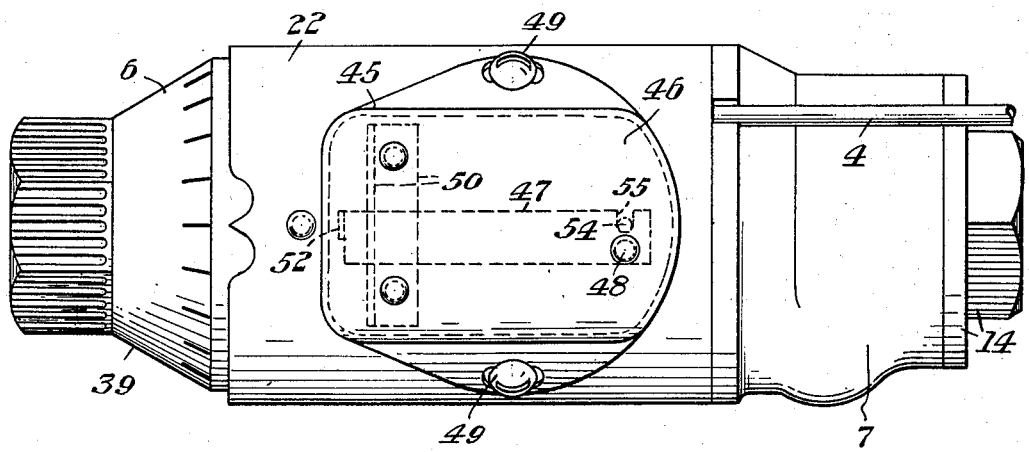
Figure 3 is a top plan view of the construction shown in Figure 1.

In the construction shown in the drawings, a bulb 2 is provided which contains an expansible fluid. The bulb 2 is inserted in the chamber 3 the temperature of which is to be controlled, and the expansible fluid contained therein expands and contracts in accordance with variations in temperature in the chamber. The bulb 2 is connected by means of a capillary tube 4 to an expansible bellows 5 which, together with the adjusting dial 6 and the valve 7 are conveniently located without the chamber 3. The adjusting dial, bellows and valve and cooperating parts may be conveniently located at any desired point. In the copending application of Robert E. Newell, Clarence W. Robertshaw and William B. Mackintosh, referred to above, these parts are shown as mounted adjacent the front panel of the stove but any other desired location may be utilized. The capillary tube 4 and the bellows 5 contain a fluid, and the expansion or contraction of this fluid in the bulb results in an expansion of the bellows 5.

The construction shown in the drawings is adapted for controlling the flow of fluid to a burner or the like. The fluid flow is controlled by means of a valve 7 having an inlet port 8 and an outlet port 9. A valve member 10 is provided in the valve between the inlet and outlet ports and is adapted to cooperate with a seat 11 formed in the valve casing. The valve member 10 is normally forced toward its seat by means of a spring 12, one end of which seats against the valve member 10 around the boss 13 and the other end of which is seated on the valve cap 14. The valve cap 14 is conveniently threaded in the casing so as to permit ready access to the internal portion of the valve.

The valve member 10 is operated by means of a valve stem or gland pin 15 which extends through an opening 16 in the valve casing, the pin 15 projecting beyond the face 17 of the casing.

The expansible bellows 5 is mounted on a base plate 18. This base plate is substantially circular in general configuration but having two opposite sides thereof formed along parallel cords of the circle. The bellows 5 is provided with a threaded extension 19 adapted to project through an opening 20 centrally located in the base plate. A nut 21 is mounted on the threaded stem 19 for rigidly securing the bellows to the base plate 18. A casing 22, which is substantially cylindrical in shape, is provided for encasing the bellows and a part of the control means for protecting them against dirt, local heat, etc. The casing 22 on its inner circumference is provided with a shoulder 23 extending completely around the housing and against which the circular portions of the base plate 18 abut when the structure is assembled. The face 17 of the valve is provided with threaded openings 24 adapted to receive threaded bolts 25 which project through openings 26 in the base plate 18 and are threaded in the openings in the valve casing for rigidly securing the base plate, the housing and the valve casing together.

The end of the bellows 5 mounted on the base plate 18 is stationary and the opposite end of the bellows movable. The movement of the forward end of the bellows 5 is transmitted to the gland pin or valve stem 15 by the construction which will now be described. This mechanism also transmits adjustments from the adjusting dial 6 to the valve stem 15.

The forward end of the bellows 5 abuts against one end of an adjusting screw 27. This adjusting screw is provided with a threaded portion 28 adapted to cooperate with a threaded opening 29 in the head 30 of a yoke 31. This yoke is provided with oppositely disposed arms 32 which extend around the bellows and pass through recessed portions 32' in the base plate 18. The lower end of the yoke 31 is substantially circular and is provided with a centrally disposed opening 34. A disk or plate 35 is mounted in recesses in the circular portion of the yoke adjacent the opening 34. This disk is preferably of bi-metal for the purpose of compensating local temperatures to which this structure is subjected.

A compression spring 36 is mounted in the yoke 31, one end thereof being mounted on a seat 37 formed in the circular base portion of the yoke and the other end bearing against the base plate 18 and being held in position by a boss 38 on the one face of the base plate.

The plate or disk 35 bears against the gland pin or valve stem 15 and the movement of the bellows and the yoke 31 is transmitted to the valve member through the plate 35 and the pin 15.

As can be readily seen from the above description, expansion of the bellows 5 will cause the adjusting screw 27 to move to the left as viewed in the drawings and the screw will carry the yoke in the same direction and also the plate 35, thereby permitting the spring 12 to force the valve member toward its seat. On the other hand, contraction of the bellows 5 will cause the yoke and the plate 35 carried thereby to move in the opposite direction, thereby forcing the valve stem and valve member in the opposite direction to force the valve member away from its seat. Where the expansion of the bellows is occasioned by local heat not affecting the bulb 2, the bi-metal compensating disk 35 will be subjected to similar temperatures and will therefore not be transmitted to the stem or gland pin 15 and the valve member. Where a structure of this character is to be mounted in a position where there is little or no likelihood of its being subjected to fluctuations in temperature, the bi-metal plate or disk may be replaced by a plate which will have no compensating effect.

In structures of this character it is desirable to provide means for adjusting the structure to respond to desired temperatures so that the valve will open and close at appropriate times to maintain a given temperature in the medium or chamber in which the bulb is located. In the construction shown in the drawings, an adjusting dial 39 is secured to the adjusting screw 27 and projects beyond the casing surrounding the bellows and the control mechanism before described. This adjusting dial will carry appropriate indicia cooperating with a pointer carried by the casing so that the operator may adjust the structure to operate at desired temperatures.

Figure 4:
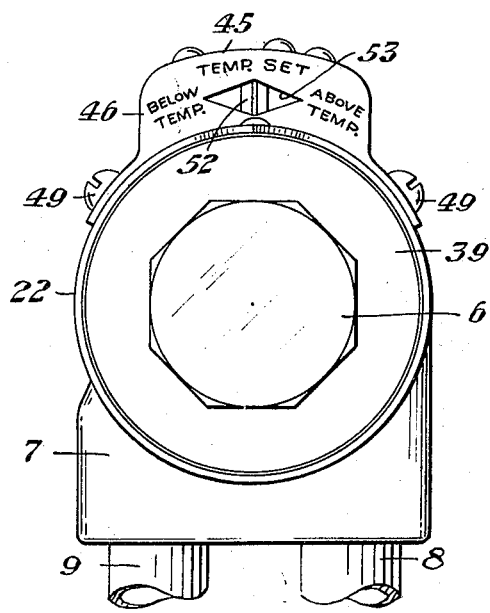
Figure 4 is a front elevational view of the structure shown in Figures 1, 2 and 3.

In the embodiment of the invention shown in Figures 1 to 4, inclusive, an indicator, indicated generally by the reference character 45, is mounted on the casing surrounding the bellows and control apparatus. This indicator consists of a casing 46 and a lever 47 which is pivoted within the casing 46 on a stud 48 carried by the casing 46. The indicator is secured on the bellows casing by means of screws or bolts 49. The lever 47 is pivotally mounted on the stud 48 adjacent the rear end thereof. It extends forwardly through the casing 46 and the forward end thereof is supported by a bracket 50 secured to the casing 46. This bracket 50 is provided with a slot 51 so as to permit horizontal movement of the lever. The forward end of the lever 47 is turned upwardly as at 52 and marked on the outside with a colored band. This colored band is visible through a diamond-shaped opening 53 in the front end of the casing.

An actuating pin 54 is driven through the gland pin of the valve and extends through the casing surrounding the bellows and control apparatus. At its upper end and within the housing 46 it is arranged to cooperate with the lever 47 for imparting movement thereto upon movement of the gland pin 15. The actuating pin 54 cooperates with a slot 55 in the lever 47 so that both forward and rearward movement of the gland pin 15 will move the lever 47 about its pivot point on the stud 48.

A spring 56 is placed back of the actuating pin 54 so as to cause the gland pin 15 to continue to follow the action of the bellows after the valve has been closed. The purpose of this is to indicate temperatures above, as well as below, the temperatures set.

In operation the adjusting dial of the thermostatic structure may be set at any desired temperature—for instance, 400°. This setting of the adjusting dial causes the valve to open and by means of the leverage described, the indicator on the front of the housing will move toward the left toward the point of the diamond marked "Below temp.". As the oven heats and the valve approaches the closed position, the indicator will move toward the center of the diamond-shaped opening. When the oven has reached the temperature set on the dial, the band on the indicator will be exactly in the middle of the diamond-shaped opening at the point marked "Temp. set". Should the temperature of the oven rise above that for which the structure is set, the indicator will move on toward the outside of the diamond-shaped opening appropriately labeled "Above temp.". As the oven settles again to the correct point, the indicator lever will return to the middle of the diamond and will remain there so long as the temperature remains constant at the setting. If the operator should now turn the dial to, say, 300°, the indicator will disappear on the right side of the dial marked "Above temp.". This means, of course, that the oven is above the temperature desired. As the oven settles to the 300° point, the indicator will again appear in the diamond and move towards the center thereof and when the temperature has been stabilized at the desired reading, it will assume the position in the center of the diamond.

In the embodiment of the invention shown in Figures 5 to 8, inclusive, the indicator indicated generally by the reference character 60 is mounted on the casing surrounding the bellows and control apparatus. This indicator comprises a casing 61, an indicator arm 62, a lever 63 and a return spring 64. The indicator arm 62 is fixedly secured in a groove 65 in the lever 63 and extends forwardly through the casing 61 from its point of contact with the lever to the front part of the housing or casing 61 which is provided with an opening 66. The indicator arm 62 at its forward end carries an indicator 67 adapted to cooperate with the opening 66 in the housing and show when the temperature of oven or other chamber to which the structure is applied has reached the desired point. The indicator 67 carries a mark adapted to cooperate with a suitable mark on the front of the housing and when the temperature of the oven is exactly at that desired, the mark on the indicator will coincide with the appropriate mark formed on the indicator housing. The lever 63 is rotatably mounted on a stud 68 which is carried by the housing 61. The lever is adapted to rotate about this stud and to move the indicator in accordance with movement imparted to this lever. The actuating pin 69, as in the other embodiments shown in the drawings, is adapted to be actuated by the valve stem or gland pin for operating the valve for controlling the supply of fuel to the burner for the chamber, the temperature of which is being controlled, and at its upper end abuts the lever 63 as at 70 for the purpose of imparting movement in one direction to the lever.

A return spring 64 is provided for the purpose of causing the lever to follow the actuating pin 69 as it recedes to the right as shown in Figure 6. One end of this return spring is rigidly secured in an opening in the stud 68 and the other end thereof is adapted to be inserted in an opening 71 in the lever.

The use of a return spring for causing the indicator and the lever on which it is mounted to follow the actuating pin is more desirable than the provision of a structure such as that shown in Figures 1 to 4, inclusive, wherein the actuating pin is adapted to operate in a slot in the lever. In a structure embodying a return spring of this character, there is no chance of there being any lost motion and in structures of this character it is highly desirable that there be no lost motion as the leverage is high, and when the oven reaches a given temperature the mark on the indicator must coincide exactly with the indicia on the front end of the housing which also serves as a pointer for the adjusting dial.

Another advantage of the structure shown in Figures 5 to 8, inclusive, resides in the fact that the indicator 67 is carried by an indicator lever 62 which is formed of a small wire. This is preferable over a structure embodying a solid lever as the wire will give when the indicator reaches the side of the housing. This will permit the thermostat to continue to move without jamming and this non-jamming feature permits the use of a narrower housing as it is entirely immaterial whether the indicator impinges on either side thereof.

The particular structure shown in Figures 5 to 8, inclusive, is so designed as to provide for an extension so that the indicator assembly can be put on thermostats which have longer tubular housings than that shown in Figures 5 to 8, inclusive. In Figure 9 I have shown a structure which is similar to that shown in Figures 5 to 8, inclusive, except that in this embodiment an extension 72 connects the actuating pin 69' with the lever 63' carrying the indicator arm and the indicator. This extension 72 may be formed of any desirable material such as music wire, and is adapted to be connected with the lever 63' to one side of the pivot. It will be readily seen that a structure of this character may be utilized regardless of the length of the housing and the distance between the indicator lever and the indicator actuating pin.

As pointed out above, one of the important features of the present invention is that the use of an indicator of this character makes it possible to determine at a glance whether the dial and thermostat is properly calibrated and to readily readjust this dial if it is not properly calibrated without lighting the oven or pursuing various other known methods of checking the adjustment of structures of this character. The "cold checking" of the structure which I provide is accomplished in the following manner. The adjusting dial is turned until the indicator is exactly in the center of the opening in the front of the indicator housing. When the indicator is in the center of this opening this means that the valve seat is just closed, or very nearly closed. If the dial is properly calibrated, the 70° mark on the dial should be exactly opposite the appropriate indicia. If it is not, the set screw securing the dial to the adjusting shaft is loosened and the dial rotated on the shaft until the 70° mark on the dial is opposite the mark in the indicator. This can be done at any time the thermostat is on the stove without the necessity of lighting the oven, and tells the operator at a glance whether the thermostat is properly calibrated.

This advantage could not be obtained if the indicator was operated by the bellows or the thermostatic element as is the case with indicators now in use. If the indicator is fastened to the thermostatic element, it would not move when the dial is turned to, say, room temperature, and it would only move when there was an actual change in temperature causing an expansion of the bellows. It will be readily seen, therefore, that the position of the indicator would be no indication that the valve was closed as is the case where the indicator is connected with the controlling mechanism and made responsive to the movement of the dial.

It will be readily apparent from the above description that the indicating structure which I provide may be readily embodied in thermostatic structures of various types. One of the particular advantages of a structure of this character resides in the fact that it is operated by the control mechanism and does not require the complication of an additional temperature scale as in the case of indicators operated directly by the thermostatic element such as a bi-metal strip. Another particular advantage resides in the fact that it obviates the use of an oven thermometer but nevertheless provides a structure which is of such character as to enable the operator at a glance to determine whether or not the chamber or oven is at the desired temperature. Another desirable feature thereof is that it is universally applicable to various types of thermostatic structures.

While I have shown and described a preferred embodiment and application of my invention, it will be understood that it may be otherwise embodied within the scope of the appended claims.

I claim:

1. The combination with a chamber the temperature of which is to be controlled, of a thermostatic structure comprising thermally responsive means extending into said chamber, control means arranged to be actuated by said thermally responsive means, adjusting means including a dial which may be set to various temperatures for adjusting said control means relative to said thermally responsive means, and an indicator operatively connected with said adjusting means and arranged to register in relation to a fixed point to relatively indicate the temperature of the chamber with respect to the dial setting at temperatures both higher and lower than said dial setting.

2. The combination with a chamber the temperature of which is to be controlled, of a thermostatic structure comprising thermally responsive means extending into said chamber, control means arranged to be actuated by said thermally responsive means, adjusting means including a dial which may be set to various temperatures for adjusting said control means relative to said thermally responsive means, and an indicator operatively connected with said adjusting means and arranged to register at a permanently fixed point to signal when the chamber temperature corresponds with the dial setting.

3. A thermostatic structure comprising thermally responsive means, control means arranged to be actuated by said thermally responsive means, adjusting means including a dial for adjusting said control means relative to said thermally responsive means, and an indicator operatively connected to and movable with said adjusting means over the entire range of adjustment at any particular temperature of the thermally responsive means, whereby the indicator will be effective for showing proper calibration of the adjusting dial.

4. A thermostatic structure comprising thermally responsive means, control means including a valve and valve stem arranged to be actuated by said thermally responsive means, means for causing said valve stem to continue to follow any movement of said thermally responsive means after said valve is closed, an indicator, and connecting means for transmitting movement of said valve stem to said indicator.

5. A thermostatic structure comprising thermally responsive means, control means including a valve and valve stem arranged to be actuated by said thermally responsive means, temperature compensating means connecting said control means and said thermally responsive means, means for causing said valve stem to continue to follow any movement of said thermally responsive means after said valve is closed, an indicator, and connecting means for transmitting movement of said valve stem to said indicator.

6. The combination with a chamber the temperature of which is to be controlled, of a thermostatic structure comprising thermally responsive means, control means including a valve and valve stem arranged to be actuated by said thermally responsive means in response to temperatures in said chamber, means for causing said valve stem to continue to follow any movement of said thermally responsive means after said valve is closed, an indicator for indicating temperature conditions in said chamber, and connecting means for transmitting movement of said valve stem to said indicator.

7. A thermostatic structure comprising thermally responsive means, control means arranged to be actuated by said thermally responsive means, adjusting means including a dial which may be set at various temperatures, an indicator connected to and movable with said adjusting means, means for limiting the movement of said indicator to a fraction of that which would otherwise result from movement of said dial over its entire temperature adjustment range, and a yieldable connection between said indicator and said adjusting means whereby jamming of the structure because of said movement limiting means is avoided.

8. The combination with a chamber the temperature of which is to be controlled, of a thermostatic structure comprising thermally responsive means extending into said chamber, control means arranged to be actuated by said thermally responsive means, adjusting means including a dial which may be set at various temperatures, an indicator connected to and movable with said adjusting means and arranged to signal when the chamber temperature corresponds with the dial setting, means for limiting the movement of said indicator to a fraction of that which would otherwise result from movement of said dial over its entire temperature range, and a yieldable connection between said indicator and said adjusting means whereby jamming of the structure because of said movement limiting means is avoided.

ROBERT E. NEWELL.